(12) United States Patent
Choi et al.

(10) Patent No.: US 8,760,595 B2
(45) Date of Patent: Jun. 24, 2014

(54) ARRAY SUBSTRATE FOR FRINGE FIELD SWITCHING MODE LIQUID CRYSTAL DISPLAY DEVICE AND METHOD FOR FABRICATING THE SAME

(75) Inventors: Seung-Kyu Choi, Paju-Si (KR); Sun-Hwa Lee, Paju-Si (KR); Dong-Su Shin, Paju-Si (KR); Cheol-Hwan Lee, Suwon-Si (KR); Won-Keun Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 125 days.

(21) Appl. No.: 13/592,064

(22) Filed: Aug. 22, 2012

(65) Prior Publication Data
US 2013/0063673 A1    Mar. 14, 2013

(30) Foreign Application Priority Data

Sep. 9, 2011   (KR) .................. 10-2011-0092252
Jul. 5, 2012    (KR) .................. 10-2012-0073512

(51) Int. Cl.
*G02F 1/1368*    (2006.01)

(52) U.S. Cl.
USPC ............................................. 349/43; 349/138

(58) Field of Classification Search
CPC ............ H01L 29/786; H01L 29/78696; H01L 29/41733; H01L 29/78669; H01L 27/3262; H01L 27/1288; H01L 27/088; H01L 27/1251; H01L 27/127; H01L 27/3244; H01L 33/42; H01L 33/58; H01L 21/77; H01L 51/5284; H01L 233/5329; G02F 1/134363; G02F 1/136227; G02F 1/1368; G02F 1/136286; G02F 1/134309; G02F 1/1333; G02F 1/1339; G02F 1/134336; G02F 1/133345; G02F 1/133514; G02F 1/13439; G02F 1/133512; G02F 1/136209; G02F 2001/134372; G02F 2001/134318; G02F 2001/1351; G02F 2001/136236; G02F 2201/123; G09G 2300/0434
USPC ............. 257/59, 57, E29.273, E21.409, 257/E33.053, E33.062, E33.068; 349/43, 349/106, 139, 143, 110, 138, 141, 187; 204/192.25

See application file for complete search history.

(56) References Cited

U.S. PATENT DOCUMENTS

| 6,128,060 A | 10/2000 | Shimada et al. |
| 2001/0040665 A1 | 11/2001 | Ahn |
| 2009/0322975 A1* | 12/2009 | Song et al. .................. 349/46 |

* cited by examiner

*Primary Examiner* — Thoi Duong
(74) *Attorney, Agent, or Firm* — Birch, Stewart, Kolasch & Birch

(57) ABSTRACT

Fringe field switching (FFS) mode liquid crystal display device and method for fabricating the same, are discussed, the device including a gate line formed in one direction on a surface of a first substrate; a data line formed on the first substrate, and crossed with the gate line to thereby define a pixel region; a thin-film transistor formed on the first substrate, and formed at an intersection of the gate line and the data line; an insulating layer having an opening portion located at an upper portion of the thin-film transistor to expose at least a gate portion of the thin-film transistor; a pixel electrode formed at an upper portion of the insulating layer, and connected to the exposed thin-film transistor; a passivation layer formed at the upper portion of the insulating layer; and common electrodes formed at an upper portion of the passivation layer and separated from one another.

20 Claims, 14 Drawing Sheets

ARRAY SUBSTRATE FOR FRINGE FIELD SWITCHING MODE LIQUID CRYSTAL DISPLAY DEVICE AND METHOD FOR FABRICATING THE SAME

CROSS-REFERENCE TO RELATED APPLICATION

This application claims priority to and the benefit of Korean Patent Application Nos. 10-2011-0092252, filed on Sep. 9, 2011, and 10-2012-0073512, filed on Jul. 5, 2012, which are hereby incorporated by reference for all purposes as if fully set forth herein.

BACKGROUND OF THE INVENTION

1. Field of the Invention

Embodiments of the invention relate to a liquid crystal display device, and more particularly, to an array substrate for a fringe field switching (FFS) mode liquid crystal display device and method for fabricating the same.

2. Description of the Related Art

In general, the driving principle of a liquid crystal display device is based on optical anisotropy and polarization of liquid crystals. Liquid crystals having an elongated structure exhibit directivity in molecular arrangement, and thus, the direction of their molecular arrangement can be controlled by artificially applying an electric field to liquid crystals.

Accordingly, if the molecular arrangement direction of liquid crystals is arbitrarily controlled, then the molecular arrangement of liquid crystals may be changed, and light is refracted in the molecular arrangement direction of liquid crystals by optical anisotropy to exhibit image information.

At present, an active matrix liquid crystal display device (AM-LCD; hereinafter, abbreviated as a "liquid crystal display device") in which thin-film transistors and pixel electrodes connected to the thin-film transistors are arranged in a matrix form have been widely used due to its resolution and video implementation capability.

The liquid crystal display device may include a color filter substrate (i.e., an upper substrate) formed with common electrodes, an array substrate (i.e., a lower substrate) formed with pixel electrodes, and liquid crystals filled between the upper and lower substrates, in which liquid crystals are driven by an electric field applied in the vertical direction between the common electrode and pixel electrode, thereby having excellent transmittance and aperture ratio.

However, the driving of liquid crystals by an electric field applied in the vertical direction has a drawback of providing insufficient viewing angle characteristics. Accordingly, a driving method of liquid crystals by in-plane switching has been newly proposed to overcome the foregoing drawback, and the driving method of liquid crystals by in-plane switching has excellent viewing angle characteristics.

Such an in-plane switching mode liquid crystal display device may include a color filter substrate and an array substrate facing each other, and a liquid crystal layer is interposed between the color filter substrate and the array substrate.

A thin-film transistor, a common electrode and pixel electrode are provided for a plurality of pixels, respectively, defined on a transparent insulating substrate on the array substrate.

Furthermore, the common electrode and pixel electrode are configured to be separated from each other in parallel on the same substrate.

In addition, the color filter substrate may include a black matrix at a portion corresponding to a gate line, data line, and a thin-film transistor on a transparent insulating substrate, and a color filter corresponding to the pixel.

Moreover, the liquid crystal layer is driven by a horizontal electric field between the common electrode and pixel electrode.

In this instance, the common electrode and pixel electrode are formed with a transparent electrode to secure brightness.

Accordingly, a fringe field switching (FFS) technique has been proposed to maximize the brightness enhancement effect. The FFS technique allows liquid crystals to be controlled in a precise manner, thereby obtaining high contrast ratio with no color shift.

A method of fabricating a fringe field switching (FFS) mode liquid crystal display device according to the related art will be described with reference to FIGS. 1 through 3.

FIG. 1 is a schematic plane view illustrating a fringe field switching (FFS) mode liquid crystal display device according to a related art. FIG. 2 is an enlarged plane view illustrating a portion "A" of FIG. 1, and schematically illustrates a black matrix (BM) for covering a drain contact hole portion by taking a bonding margin into consideration. FIG. 3 is a schematic cross-sectional view along line III-III of FIG. 1, and illustrates a fringe field switching (FFS) mode liquid crystal display device.

An array substrate for a fringe field switching (FFS) mode liquid crystal display device according to the related art may include a plurality of gate lines 13 extended in one direction on a transparent insulating substrate 11 to be separated from one another in parallel; a plurality of data lines 21 crossed with the gate lines 13 to define pixel regions in the crossed areas; a thin-film transistor (T) provided at an intersection of the gate line 13 and the data line 21, and made of a gate electrode 13a extended from the gate line 13 in the vertical direction, a gate insulating layer 15, an active layer 17, a source electrode 23 and a drain electrode 25; a photo acryl layer 29 formed on a front surface of the substrate including the thin-film transistor (T); a common electrode 33 having a large area formed on the photo acryl layer 29; a passivation layer 35 formed on the photo acryl layer 29 including the common electrode 33 to expose the drain electrode 25; and a plurality of pixel electrodes 37 formed on the passivation layer 35 to be electrically connected to the drain electrode 25, as illustrated in FIGS. 1 through 3.

In this instance, a common electrode 33 having a large area is disposed on a front surface of the pixel region with a space separated from the gate line 13 and the data line 21.

Furthermore, a plurality of rod-shaped pixel electrodes 37 are disposed on the common electrode 33 by interposing the passivation layer 35 therebetween. In this instance, the common electrode 33 and the plurality of pixel electrodes 37 are formed of Indium Tin Oxide (ITO) which is a transparent conductive material.

In addition, the pixel electrode 37 is electrically connected to the drain electrode 25 through a drain contact hole 31 formed on the photo acryl layer 29.

Moreover, though not shown in the drawing, a color filter layer (not shown) and a black matrix (refer to BM in FIGS. 1 and 2) disposed between the color filter layers (not shown) to block the transmission of light are deposited on a color filter substrate (not shown) separated from and bonded to the insulating substrate 11 formed with the common electrode 33 and a plurality of pixel electrodes 37. In this instance, as illustrated in FIG. 1, the black matrix (BM) may be formed on the color filter substrate (not shown) corresponding to a portion of the drain contact hole 31 including the gate line 13 and the data line 21.

Furthermore, a liquid crystal layer (not shown) may be formed between the color filter substrate (not shown) and the insulating substrate 11 bonded to each other.

As described above, in the related art, a photo acryl layer may be used to reduce a parasitic capacitance.

However, a drain contact hole should be formed to connect a pixel electrode and a drain electrode of the thin-film transistor to the photo acryl layer, and a liquid crystal disclination region hole is created at the circumference of the drain contact hole during the formation of the drain contact hole 31, thereby causing light leakage.

Accordingly, in the related art, in order to prevent light leakage caused by creating a liquid crystal disclination region at the circumference of the drain contact hole, all circumference portion of the drain contact hole should be covered by using a black matrix (BM), and thus, an opening region thereof, namely, an area of the transmission region, may be reduced, thereby decreasing the transmittance of a pixel. In particular, as illustrated in FIG. 2, the drain contact hole should be covered with a black matrix (BM) by taking a bonding margin into consideration as much as a distance (d1) to prevent light leakage caused by a disclination region of liquid crystals created by the drain contact hole 31 as illustrated in FIG. 2, and thus, the transmission region of a pixel may be reduced as much as the distance, thereby decreasing the transmittance to an extent.

SUMMARY OF THE INVENTION

The invention is provided to enhance the foregoing problems, and an objective of the invention is to provide a fringe field switching (FFS) mode liquid crystal display device capable of maximizing an opening region of the pixel without separately forming a drain contact hole for contacting a drain electrode to increase transmittance, and method for fabricating the same.

In order to accomplish the foregoing objective, there is provided an array substrate for a fringe field switching (FFS) mode liquid crystal display device, and the array substrate may include a gate line formed in one direction on a surface of the substrate; a data line crossed with the gate line to thereby define a pixel region; a thin-film transistor formed at an intersection of the gate line and the data line; an insulating layer having an opening portion located at an upper portion of the thin-film transistor to expose at least a gate portion of the thin-film transistor; a pixel electrode formed at an upper portion of the insulating layer, and directly connected to the exposed thin-film transistor; a passivation layer formed at the upper portion of the insulating layer including the pixel electrode; and a plurality of common electrodes formed at an upper portion of the passivation layer and separated from one another.

In order to accomplish the foregoing objective, there is provided a method of fabricating an array substrate for a fringe field switching (FFS) AH-IPS mode liquid crystal display device, and the method may include forming a gate line in one direction on a surface of the substrate; forming a data line crossed with the gate line to thereby define a pixel region, and a thin-film transistor at an intersection of the gate line and the data line on the first substrate; forming an insulating layer having an opening portion located at an upper portion of the thin-film transistor to expose at least a gate portion of the thin-film transistor; forming a pixel electrode connected to the exposed thin-film transistor at an upper portion of the insulating layer; and forming a passivation layer at the upper portion of the insulating layer including the pixel electrode; and forming a plurality of common electrodes separated from one another at an upper portion of the passivation layer.

In order to accomplish the foregoing objective, there is provided an array substrate for a fringe field switching (FFS) mode liquid crystal display device, and the array substrate may include a gate line formed in one direction on a surface of the substrate; a data line crossed with the gate line to thereby define a pixel region; a thin-film transistor formed at an intersection of the gate line and the data line; an insulating layer having an opening portion located at an upper portion of the thin-film transistor to expose a source electrode and a gate portion of the thin-film transistor; a pixel electrode formed at an upper portion of the insulating layer, and directly connected to the exposed thin-film transistor; a passivation layer formed at the upper portion of the insulating layer including the pixel electrode; and a plurality of common electrodes formed at an upper portion of the passivation layer and separated from one another.

An array substrate for a fringe field switching (FFS) mode liquid crystal display device and method for fabricating the same in accordance with an embodiment of the invention may have the following effects.

According to an array substrate for a fringe field switching (FFS) mode liquid crystal display device and method for fabricating the same in accordance with an embodiment of the invention, a drain contact hole in a related art that has been formed to electrically connect a drain electrode to a pixel electrode is removed, and an opening portion for exposing an upper portion of the thin-film transistor is formed on an organic insulating layer such that the exposed thin-film transistor and the pixel electrode are electrically connected to each other in a direct manner, and thus, an area that has been used to form a drain contact hole in the related art can be used as an opening area to remove a drain contact hole formation portion in the related art that has been a cause of transmittance reduction, thereby enhancing transmittance by more than about 20 percent compared to the related art.

Furthermore, according to embodiments of the invention, a photosensitive photo acryl layer used to reduce a parasitic capacitance in the related art can be used as is, thereby reducing power consumption.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Hereinafter, an array substrate for a fringe field switching (FFS) mode liquid crystal display device and method for fabricating the same according to example embodiments of the invention will be described in detail with reference to the accompanying drawings.

Figure 4:
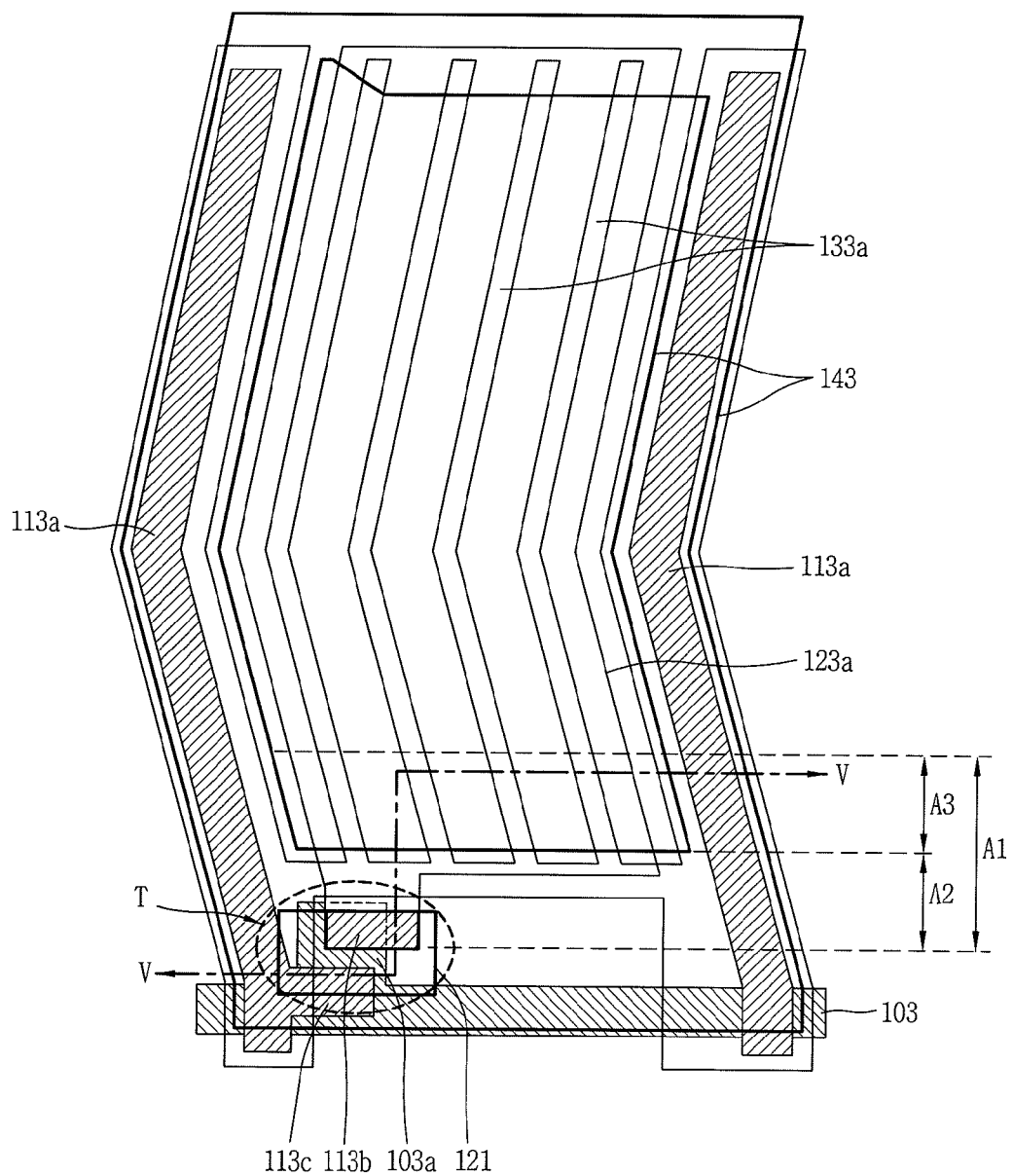
FIG. 4 is a schematic plane view illustrating a fringe field switching (FFS) mode liquid crystal display device according to an embodiment of the invention.

FIG. 4 is a schematic plane view illustrating a fringe field switching (FFS) mode liquid crystal display device according to an embodiment of the invention.

Figure 5:
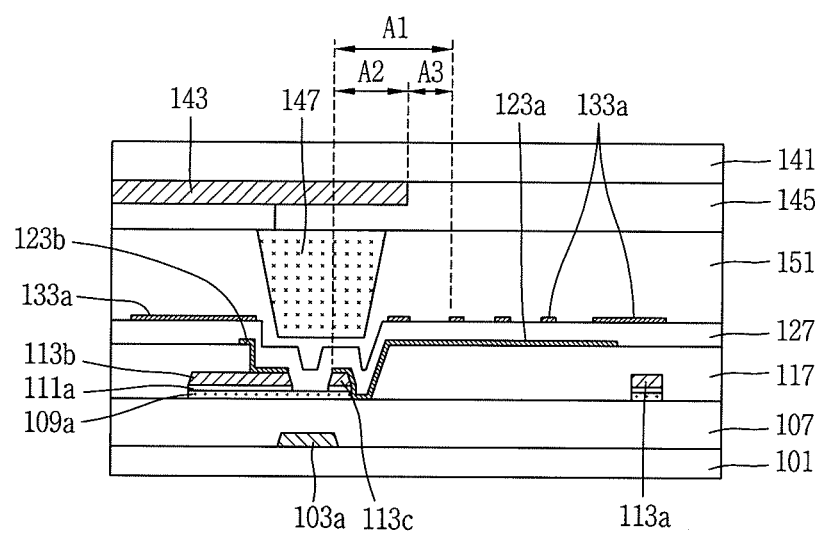
FIG. 5 is a schematic cross-sectional view along line V-V of FIG. 4, and illustrates an AH-IPS mode liquid crystal display device according to an embodiment of the invention.

FIG. 5 is a schematic cross-sectional view illustrating a fringe field switching (FFS) mode liquid crystal display device according to an embodiment of the invention, as a cross-sectional view along the line V-V of FIG. 4.

A fringe field switching (FFS) mode liquid crystal display device according to an embodiment of the invention, as illustrated in FIGS. 4 and 5, may include a gate line 103 formed in one direction on a surface of the insulating substrate 101; a data line 113a crossed with the gate line 103 to define a pixel region; a thin-film transistor (T) formed at an intersection of the gate line 103 and the data line 113a; an organic insulating layer 117 having an opening portion 121 located at an upper portion of the thin-film transistor (T) to expose the thin-film transistor (T); a pixel electrode 123a formed at an upper portion of the organic insulating layer 117, and directly connected to the exposed thin-film transistor (T); a passivation layer 127 formed at an upper portion of the organic insulating layer 117 including the pixel electrode 123a; and a plurality of common electrodes 133a formed at an upper portion of the passivation layer 127 and separated from one another.

In this instance, a pixel electrode 123a having a large area is disposed on a front surface of the pixel region with a space separated from the gate line 103 and the data line 113a, and a plurality of transparent rod-shaped common electrodes 133a are disposed to be separated from one another by a predetermined distance at an upper side of the pixel electrode 123a by interposing the passivation layer 127 therebetween.

Furthermore, as illustrated in FIG. 5, the pixel electrode 123a is electrically connected to a drain electrode 113c in a direct manner through an opening portion 121 located at an upper portion of the thin-film transistor (T) without having a separate drain contact hole. In this instance, the opening portion 121 is formed to expose a channel region (refer to reference numeral 109a in FIG. 6J) and a portion of the drain electrode 113c of the thin-film transistor (T).

On the other hand, red, green and blue color filter layers 145 and a black matrix (BM) 143 disposed between the color filter layers 145 to block the transmission of light are deposited on a color filter substrate 141 separated from and bonded to the insulating substrate 101 formed with the pixel electrode 123a and a plurality of common electrodes 133a.

In this instance, as illustrated in FIG. 4, a portion covered by the black matrix (BM) 143 may be covered by as much as the opening portion 121 at an upper portion of the thin-film transistor (T) by taking a bonding margin to the insulating substrate 101 into consideration.

Figure 1:
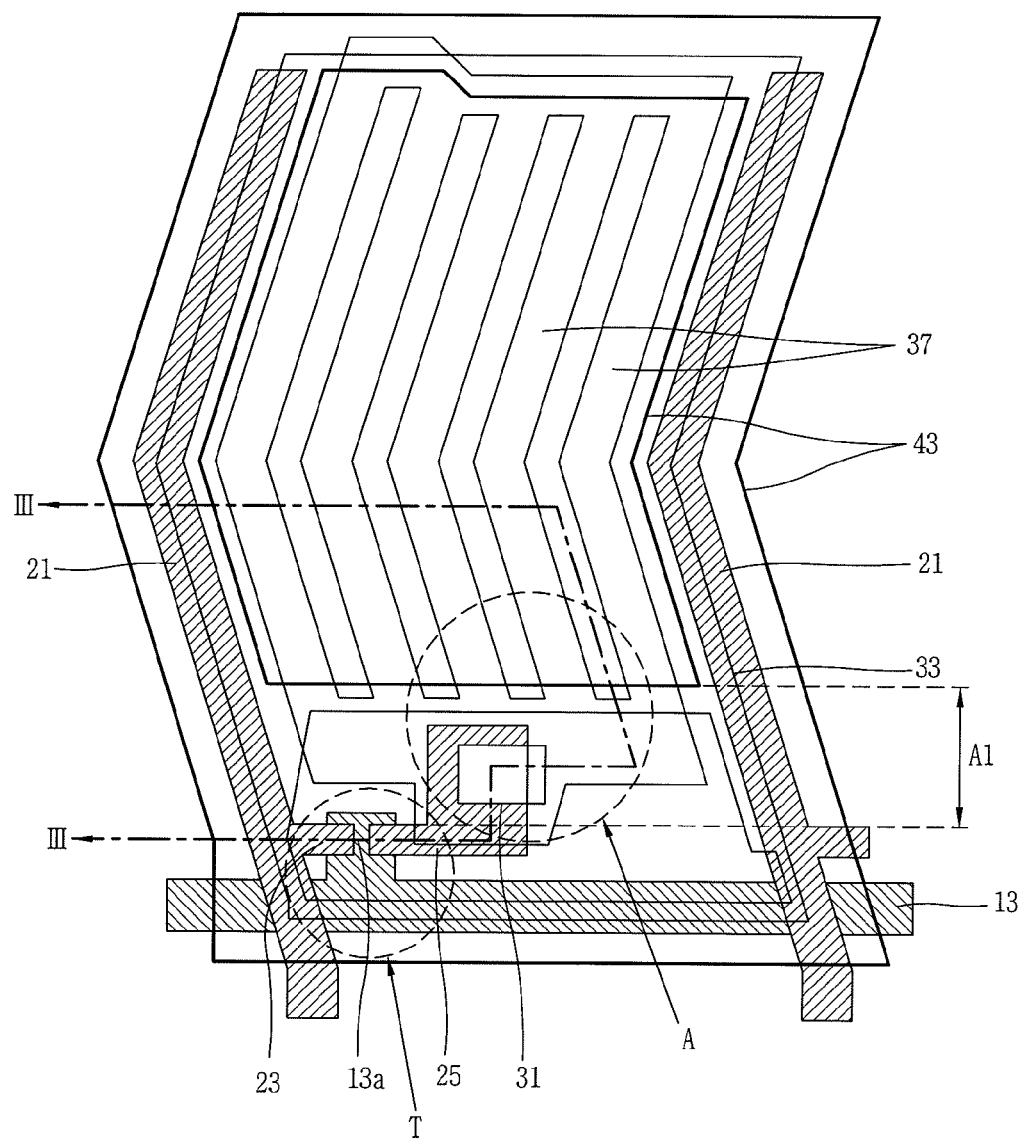
FIG. 1 is a schematic plane view illustrating a fringe field switching (FFS) mode liquid crystal display device according to a related art.
Figure 2:
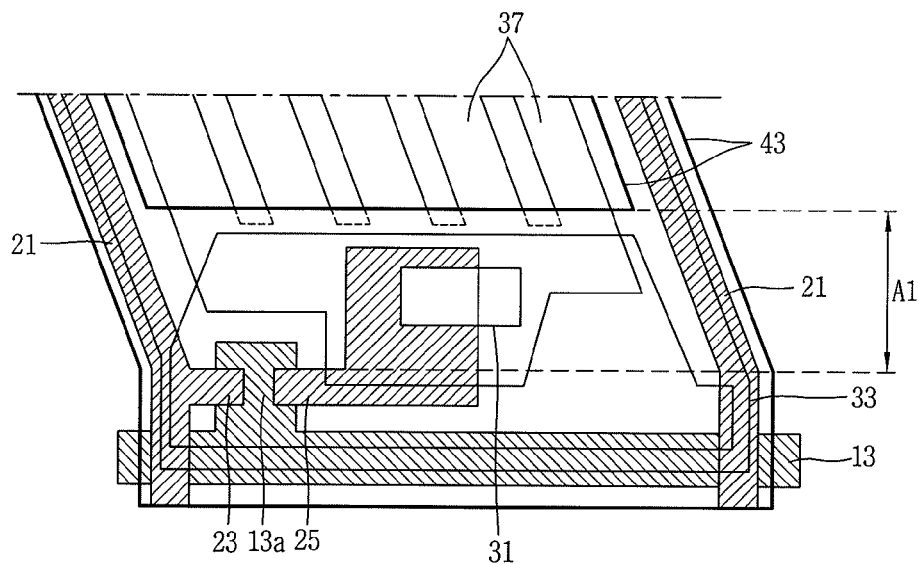
FIG. 2 is an enlarged plane view illustrating a portion "A" of FIG. 1, and schematically illustrates a black matrix (BM) for covering a drain contact hole portion and the drain contact hole portion by taking a bonding margin into consideration.
Figure 3:
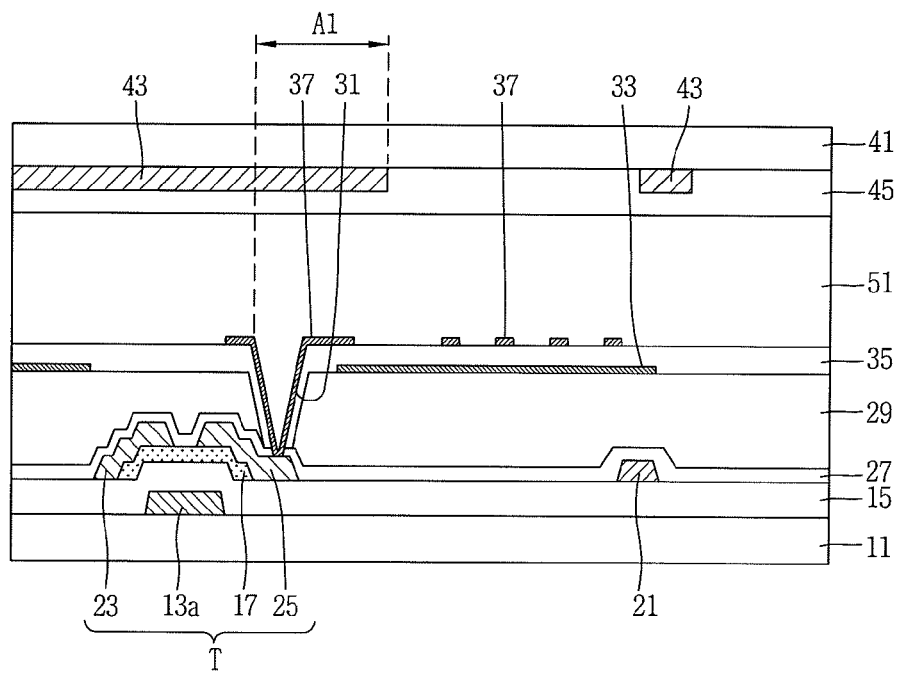
FIG. 3 is a schematic cross-sectional view along line of FIG. 1, and illustrates a fringe field switching (FFS) mode liquid crystal display device.

In this instance, the black matrix (BM) 143 covers an upper portion of the thin-film transistor (T), but the black matrix (BM) in the related art should cover up to an upper portion of the drain contact hole region formed at an upper portion of the drain electrode protruded from the gate line as well as an upper portion of the thin-film transistor (T) as illustrated in FIG. 1 by as much as an area (d1), and thus, the opening region may be reduced to an extent in the related art.

Accordingly, in an embodiment of the invention, as illustrated in FIG. 4, a drain contact hole formation region in the related art is removed, and an area (d2) of the removed drain contact hole formation region is used as an opening area to secure a region that has been covered by the black matrix (BM) as an opening area, thereby enhancing the transmittance of a pixel.

Furthermore, as illustrated in FIG. 5, a column spacer 147 for maintaining a cell gap with respect to the insulating substrate 101 is protruded at an upper portion of the red, green and blue color filter layers 145 to be inserted into the opening portion 121 formed at an upper portion of the thin-film transistor (T) formed on the insulating substrate 101.

In addition, a liquid crystal layer 151 is formed between the color filter substrate 141 and the insulating substrate 101 bonded to each other to configure a fringe field switching (FFS) mode liquid crystal display device according to an embodiment of the invention.

Through the foregoing configuration, the plurality of common electrodes 133a supply a reference voltage for driving liquid crystals, namely, a common voltage, to each pixel.

The plurality of common electrodes 133a are overlapped with the pixel electrode 123a having a large area by interposing the passivation layer 127 therebetween at each pixel region to form a fringe field.

In this manner, if a data signal is supplied to the pixel electrode 123a through the thin-film transistor (T), then the common electrode 133a supplied by a common voltage forms a fringe field so that liquid crystal molecules aligned in a horizontal direction between the insulating substrate 101 and the color filter substrate 141 are rotated by dielectric anisotropy, and thus, the light transmittance of liquid crystal molecules passing through a pixel region varies according to the rotational degree, thereby implementing gradation.

Accordingly, according to a fringe field switching (FFS) mode liquid crystal display device having the foregoing configuration in accordance with an embodiment of the invention, a photosensitive photo acryl layer used to reduce a parasitic capacitance in the related art can be used as is, thereby reducing power consumption.

Furthermore, according to an embodiment of the invention, a drain contact hole in the related art that has been formed to electrically connect a drain electrode to a pixel electrode is removed, and an opening portion for exposing an upper portion of the thin-film transistor is formed on an organic insulating layer such that the exposed thin-film transistor and the pixel electrode are electrically connected to each other in a direct manner, and thus, an area that has been used to form a drain contact hole in the related art can be used as an opening area to remove a drain contact hole formation portion in the related art that has been a cause of transmittance reduction, thereby enhancing transmittance by more than about 20 percent compared to the related art.

On the other hand, a method of fabricating an array substrate for a fringe field switching (FFS) mode liquid crystal display device having the foregoing configuration according to an embodiment of the invention will be described below with reference to FIGS. 6A through 6O.

Figure 6A:
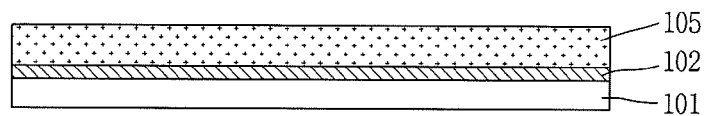
FIGS. 6A through 6O are fabrication process cross-sectional views illustrating an array substrate for a fringe field switching (FFS) mode liquid crystal display device according to an embodiment of the invention.
Figure 6B:
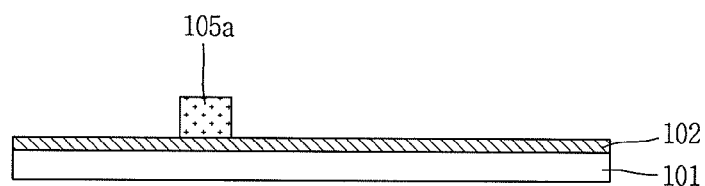
Figure 6C:
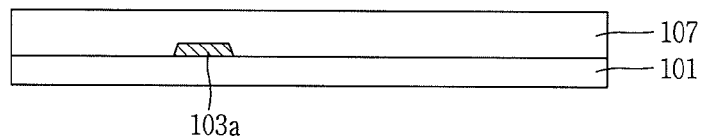
Figure 6D:
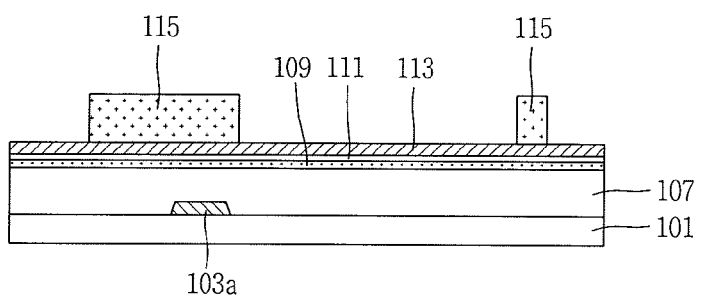
Figure 6E:
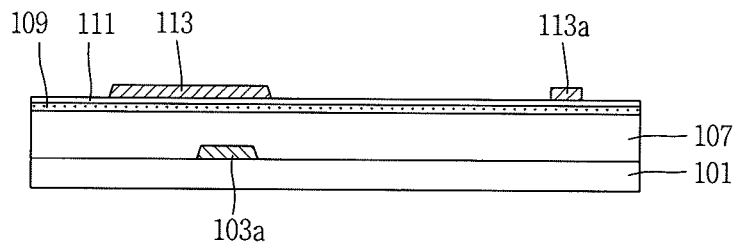
Figure 6F:
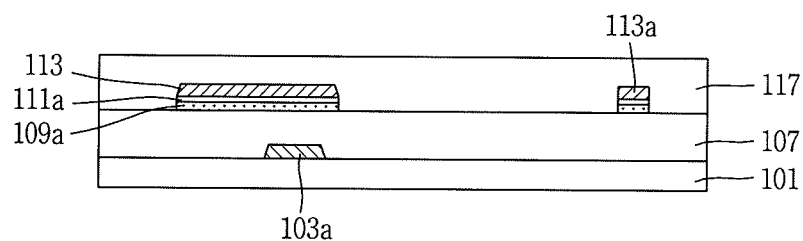
Figure 6G:
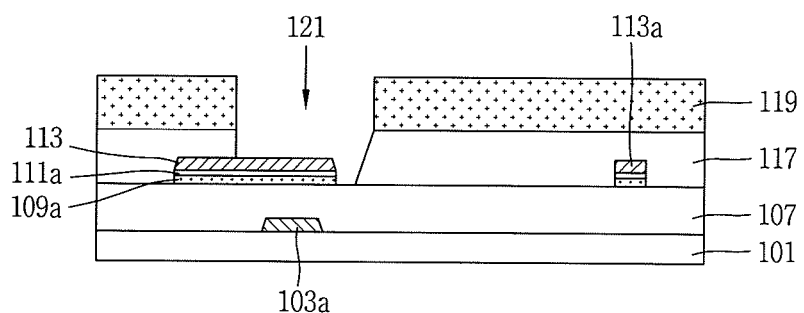
Figure 6H:
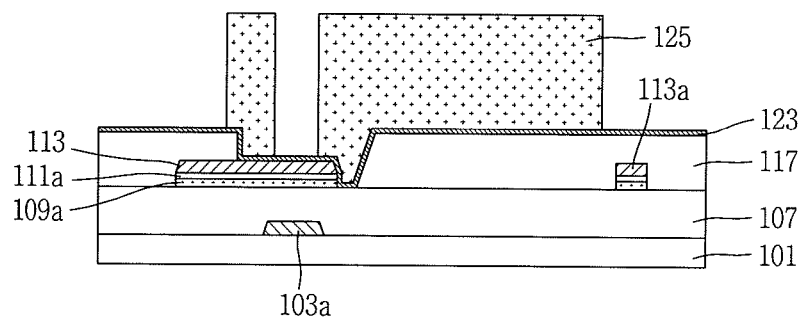
Figure 6I:
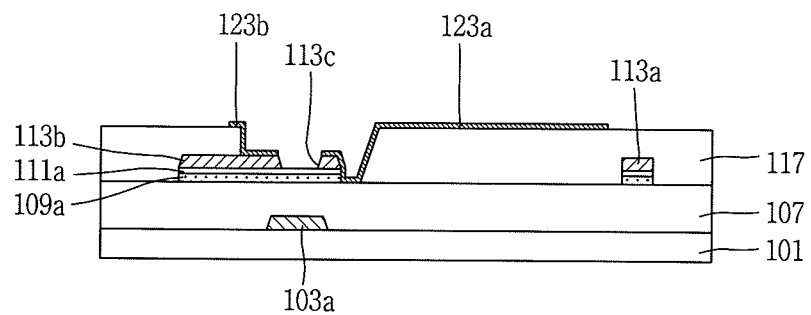
Figure 6J:
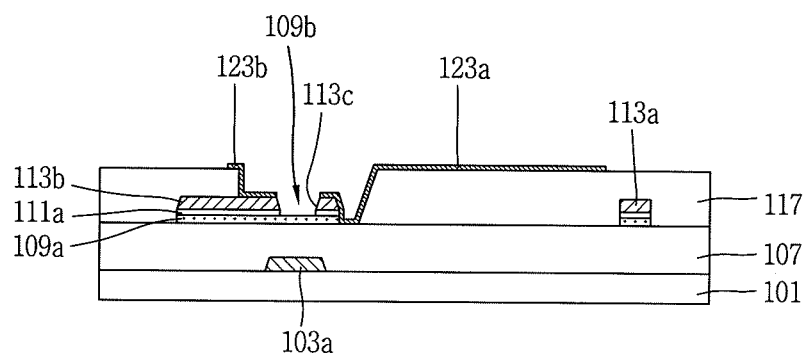
Figure 6K:
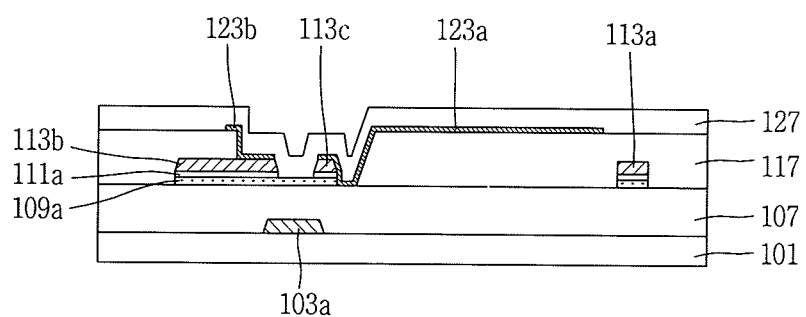
Figure 6L:
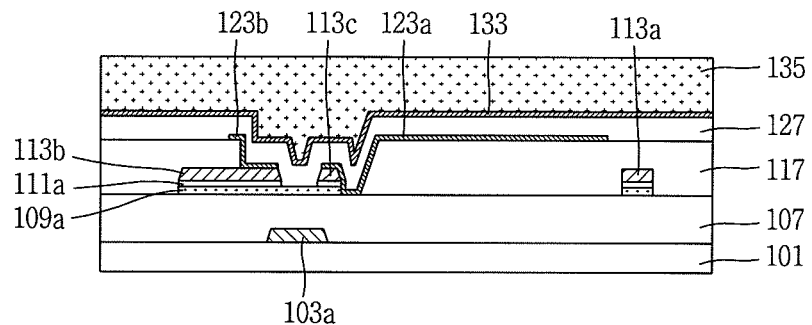
Figure 6M:
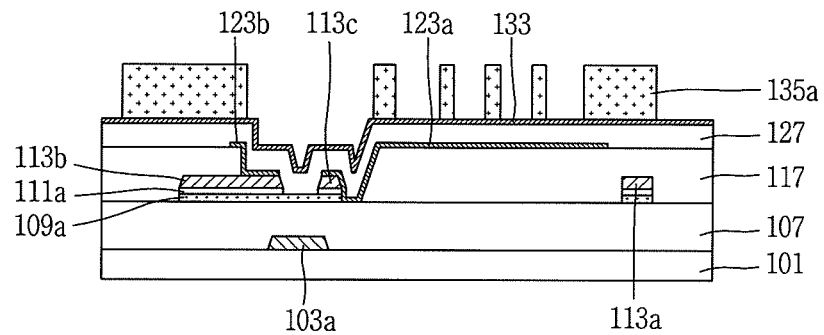
Figure 6N:
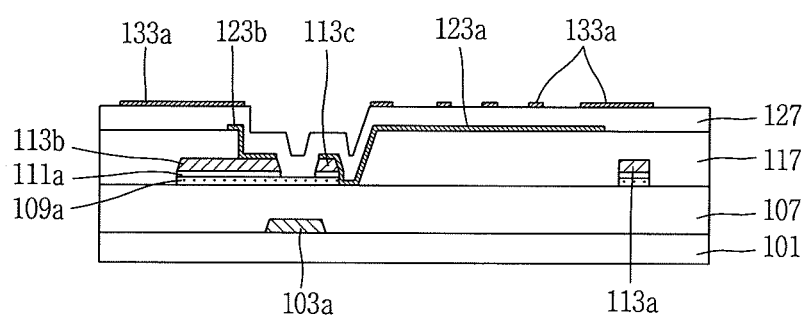
Figure 6O:
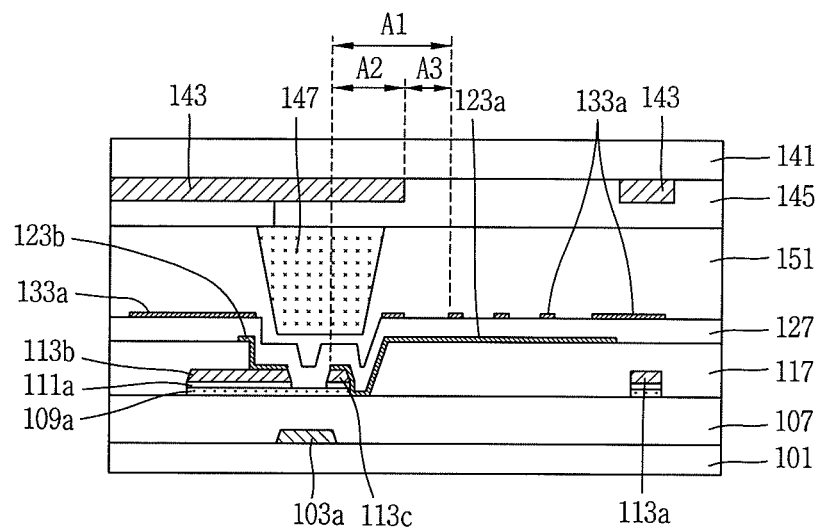

FIGS. 6A through 6O are fabrication process cross-sectional views illustrating an array substrate for a fringe field switching (FFS) mode liquid crystal display device according to an embodiment of the invention.

As illustrated in FIG. 6A, a plurality of pixel regions including a switching function are defined on a transparent insulating substrate 101, and a first conductive metal layer 102 is deposited on the transparent insulating substrate 101 by a sputtering method. In this instance, at least one selected from the group consisting of aluminium (Al), tungsten (W), copper (Cu), molybdenum (Mo), chromium (Cr), titanium (Ti), moly-tungsten (MoW), moly-titanium (MoTi), copper/moly-titanium (Cu/MoTi) may be used for a target material for forming the first conductive metal layer 102.

Next, a photoresist having a high transmittance is deposited at an upper portion of the first conductive metal layer 102 to form a first photosensitive layer 105.

Subsequently, as illustrated in FIG. 6B, an exposure process is carried out on the first photosensitive layer 105 through a photolithography process technology using an exposure mask, and then the first photosensitive layer 105 is selectively removed through a development process to form a first photosensitive pattern 105a.

Next, as illustrated in FIG. 6C, the first conductive metal layer 102 is selectively etched by using the first photosensitive pattern 105a as a blocking layer to form a gate line 103 (refer to FIG. 4), a gate electrode 103a extended from the gate line 103, and a common line separated from and in parallel with the gate line 103 at the same time. Further, the first photosensitive pattern 105a is removed, and then a gate insulating layer 107 made of silicon nitride (SiNx) or silicon oxide (SiO$_2$) is formed at a front surface of the substrate 101 including the gate electrode 103a.

Next, amorphous silicon layer (a-Si:H) 109 and amorphous silicon layer (n+ or p+) 111 containing impurities are sequentially deposited on the gate insulating layer 107. At this time, the amorphous silicon layer (a-Si:H) 109 and amorphous silicon layer (n+ or p+) 111 containing impurities are deposited using a Chemical Vapour Deposition (CVD) method. At this time, an oxide-based material layer such as indium gallium zinc oxide (IGZO) instead of amorphous silicon layer (a-Si:H) 109 may be formed on the gate insulating layer 107 and applied to an oxide thin-film transistor.

Subsequently, a second conductive layer 113 is deposited at a front surface of the substrate including the amorphous silicon layer (n+ or p+) 111 containing impurities using a sputtering method. At this time, the second conductive layer 113 may be a single layer or a multi-layer, and include at least one selected from the group consisting of aluminium (Al), tungsten (W), copper (Cu), molybdenum (Mo), indium tin oxide (ITO), Cu/ITO, chromium (Cr), titanium (Ti), moly-tungsten (MoW), moly-titanium (MoTi), copper/moly-titanium (Cu/MoTi) may be used for a target material for forming the second conductive metal layer 113.

Subsequently, a photoresist having a high transmittance is deposited at an upper portion of the second conductive layer 113 to form a second photosensitive layer.

Next, an exposure process is carried out on the second photosensitive layer through a photolithography process technology using an exposure mask, and then the second photosensitive layer is selectively removed through a development process to form a second photosensitive pattern 115.

Subsequently, as illustrated in FIG. 6E, the second conductive layer 113 is selectively wet-etched by using the second photosensitive pattern 115 as an etching mask to define a source electrode and drain electrode formation region together with the data line 113a crossed with the gate line 103 in a vertical direction (or with a vertical separation).

Next, as illustrated in FIG. 6F, a portion of the conductive layer 113 corresponding to the source electrode and drain electrode formation region and the amorphous silicon layer (n+ or p+) 111 containing impurities and amorphous silicon layer (a-Si:H) 109 below the data line 113a are sequentially etched through a dry etching process to form an ohmic contact layer 111a and an active layer 109a. At this time, a portion of the conductive layer 113 corresponding to the source electrode and drain electrode formation region and the amorphous silicon layer (n+ or p+) 111 containing impurities and amorphous silicon layer (a-Si:H) 109 below the data line 113a are patterned at the same time, and thus, an active tail will not occur.

Subsequently, the second photosensitive pattern 115 is removed, and then an inorganic insulating layer or organic insulating layer 117 is deposited at a front surface of the substrate including the active layer 109a and ohmic contact layer 111a, a portion of the conductive layer 113 corresponding to the source electrode and drain electrode formation region and the data line 113a. At this time, a photo acryl material or other photosensitive organic insulating materials exhibiting photosensitivity may be used for the organic insulating layer 117. Furthermore, since the photo acryl exhibits photosensitivity, an exposure process can be carried out without forming a separate photoresist during the exposure process. Furthermore, any one selected from silicon nitride (SiNx) and other inorganic insulating materials may be used for the inorganic insulating layer.

Next, as illustrated in FIG. 6G, an exposure process is carried out on the organic insulating layer 117 through a photolithography process technology using an exposure mask, and then the organic insulating layer 117 is selectively removed through a development process to form an opening portion 121 for exposing an upper portion (or a part thereof) of the conductive layer 113 corresponding to the source electrode and drain electrode formation region. At this time, the opening portion 121 is formed at a portion of the thin-film transistor (T), namely, a source electrode and drain electrode formation region. Furthermore, a side wall of the ohmic contact layer 111a and active layer 109a including an upper portion of the conductive layer 113 corresponding to the source electrode and drain electrode formation region and a partial upper surface of the gate insulating layer 107 are exposed by the opening portion 121. The opening portion 121 exposes an upper portion of at least a gate portion above the gate electrode 103a.

Subsequently, as illustrated in FIG. 6H, a transparent conductive material is deposited at an upper portion of the organic insulating layer 117 including the opening portion 121 using a sputtering method to form a first transparent conductive material layer 123. At this time, any one composition target selected from a transparent conductive material group including Indium Tin Oxide (ITO), Indium Zinc Oxide (IZO), and the like is used for the transparent conductive material. Furthermore, the first transparent conductive material layer 123 is directly brought into contact with a surface of the conductive layer 113 corresponding to the source electrode and drain electrode formation region and a side wall of the ohmic contact layer 111a and active layer 109a.

Next, a photoresist having a high transmittance is deposited at an upper portion of the first transparent conductive material layer 123 to form a third photosensitive layer.

Subsequently, an exposure process is carried out on the third photosensitive layer through a photolithography process technology using an exposure mask, and then the third photosensitive layer is selectively removed through a development process to form a third photosensitive pattern 125. At this time, the third photosensitive pattern 125 exposes a portion of the conductive layer 113 for the source electrode and drain electrode formation corresponding to a channel region of the active layer 109a.

Next, as illustrated in FIG. 6I, the first transparent conductive material layer 123 is selectively etched by using the third photosensitive pattern 125 as an etching mask to form a pixel electrode 123a electrically connected to the drain electrode 113c in a direct manner, together with the source electrode 113b and drain electrode 113c at the same time. At this time, the pixel electrode 123a is directly brought into contact with a side wall of the ohmic contact layer 111a and active layer 109a together with the drain electrode 113c through the opening portion 121. Furthermore, a portion of the ohmic contact layer 111a between the source electrode 113b and drain electrode 113c is also exposed during the formation of the source electrode 113b and drain electrode 113c. Then, a dummy transparent conductive layer pattern 123b is formed at a side wall of the opening portion 121 including the source electrode 113b. Accordingly, the opening portion 121 exposes the upper portions of a portion of the source electrode 113b, the gate portion above the gate electrode 103a, the active layer 109a corresponding to a channel region, and the drain electrode 113c.

Subsequently, as illustrated in FIG. 6J, a portion of the exposed ohmic contact layer 111a is selectively etched to expose a channel region of the active layer 109a.

Next, as illustrated in FIG. 6K, the third photosensitive pattern 125 is removed, and then an inorganic insulating material or organic insulating material is deposited at a front surface of the substrate including the source electrode 113b, drain electrode 113c and pixel electrode 123a to form a passivation layer 127.

Subsequently, as illustrated in FIG. 6L, a transparent conductive material is deposited at an upper portion of the passivation layer 127 using a sputtering method to form a second transparent conductive material layer 133. At this time, any one composition target selected from a transparent conductive material group including Indium Tin Oxide (ITO), Indium Zinc Oxide (IZO), and the like is used for the second transparent conductive material 133.

Next, a photoresist having a high transmittance is deposited at an upper portion of the second transparent conductive material layer 133 to form a fourth photosensitive layer 135.

Subsequently, as illustrated in FIG. 6M, an exposure process is carried out on the fourth photosensitive layer 135 through a photolithography process technology using an exposure mask, and then the fourth photosensitive layer 135 is selectively removed through a development process to form a fourth photosensitive pattern 135a.

Next, as illustrated in FIG. 6N, the second transparent conductive material layer 133 is selectively etched by using the fourth photosensitive pattern 135a as an etching mask to form a plurality of common electrodes 133a separated from one another while being overlapped with the pixel electrode 123a.

Next, the remaining fourth photosensitive pattern 135a is removed to complete the process of fabricating an array substrate for fringe field switching (FFS) mode liquid crystal display device according to an embodiment of the invention.

Then, as illustrated in FIG. 6O, a black matrix layer 143 for blocking light being entered into a region excluding the pixel area is formed on the color filter substrate 141.

Next, red, green and blue color filter layers 145 are formed on the color filter substrate 141 including the black matrix layer 143.

Subsequently, a column spacer 147 for maintaining a cell gap between the color filter substrate 141 and the insulating substrate 101 bonded to each other is formed at an upper portion of the color filter layer 145 to complete the process of fabricating a color filter array substrate. At this time, the process of forming an alignment layer on a surface of the color filter layer 145 may be additionally carried out. Furthermore, in the instance where the color filter substrate 141 and the insulating substrate 101 are bonded to each other, the column spacer 147 is inserted into the opening portion 121 formed on the insulating substrate 101 to prevent the insulating substrate 101 from being released in a horizontal direction, and thus, the bonding is properly carried out without any twisting. In other words, the opening portion 121 plays a role of fixing the column spacer 147.

Subsequently, the process of forming a liquid crystal layer 151 between the color filter substrate 141 and the insulating substrate 101 is carried out to complete the process of fabricating a fringe field switching (FFS) mode liquid crystal display device according to an embodiment of the invention.

On the other hand, an array substrate for a fringe field switching (FFS) mode liquid crystal display device according to another embodiment of the invention will described with reference to the accompanying drawings.

Figure 7:
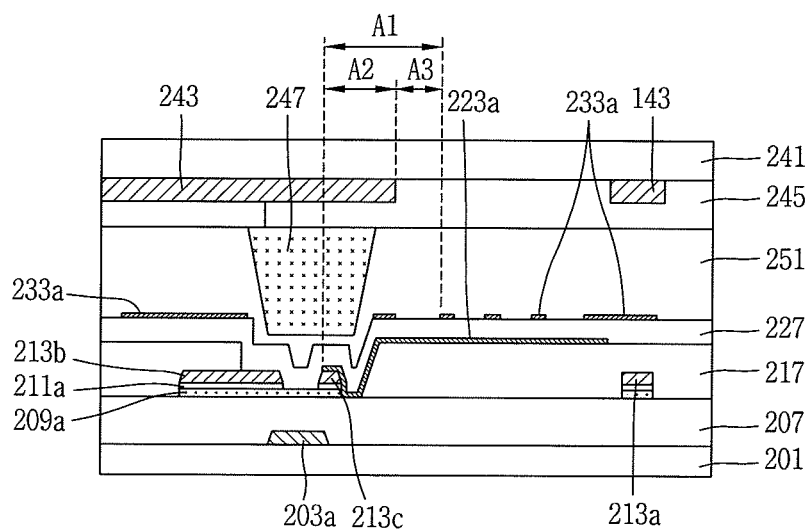
FIG. 7 is a schematic cross-sectional view illustrating a fringe field switching (FFS) mode liquid crystal display device according to another embodiment of the invention.

FIG. 7 is a schematic cross-sectional view illustrating a fringe field switching (FFS) mode liquid crystal display device according to another embodiment of the invention.

A fringe field switching (FFS) mode liquid crystal display device according to another embodiment of the invention, as illustrated in FIG. 7, may include a gate line (refer to reference numeral 103 in FIG. 4) formed in one direction on a surface of the insulating substrate 201; a data line 213a crossed with the gate line to define a pixel region; a thin-film transistor (T) formed at an intersection of the gate line and the data line 213a; an organic insulating layer 217 having an opening portion 221 located at an upper portion of the thin-film transistor (T) to expose the thin-film transistor (T); a pixel electrode 223a formed at an upper portion of the organic insulating layer 217, and directly connected to the exposed thin-film transistor (T); a passivation layer 227 formed at an upper portion of the organic insulating layer 217 including the pixel electrode 223a; and a plurality of common electrodes 233a formed at an upper portion of the passivation layer 227 and separated from one another.

In this instance, a pixel electrode 223a having a large area is disposed on a front surface of the pixel region with a space separated from the gate line and the data line 213a, and a plurality of transparent rod-shaped common electrodes 233a are disposed to be separated from one another by a predetermined distance at an upper side of the pixel electrode 223a by interposing the passivation layer 227 therebetween.

Furthermore, as illustrated in FIG. 7, the pixel electrode 223a is electrically connected to a drain electrode 213c in a direct manner through an opening portion 221 located at an upper portion of the thin-film transistor (T) without having a separate drain contact hole. In this instance, the opening portion 221 is formed to expose a channel region (refer to reference numeral 209b in FIG. 8J) and a portion of the drain electrode 213c of the thin-film transistor (T).

On the other hand, red, green and blue color filter layers 245 and a black matrix (BM) 243 disposed between the color filter layers 245 to block the transmission of light are deposited on a color filter substrate 241 separated from and bonded to the insulating substrate 201 formed with the pixel electrode 223a and a plurality of common electrodes 233a.

In this instance, a portion covered by the black matrix 243 may be covered by as much as the opening portion 221 at an upper portion of the thin-film transistor (T) by taking a bonding margin to the insulating substrate 201 into consideration.

In this instance, the black matrix (BM) 243 covers an upper portion of the thin-film transistor (T), but the black matrix (BM) in the related art should cover up to an upper portion of the drain contact hole region formed at an upper portion of the drain electrode protruded from the gate line as well as an upper portion of the thin-film transistor (T) as illustrated in FIG. 1 by as much as an area (d1), and thus, the opening region may be reduced to the extent in the related art.

Accordingly, in an embodiment of the invention, as illustrated in FIG. 4, a drain contact hole formation region in the related art is removed, and an area (d2) of the removed drain contact hole formation region is used as an opening area to secure a region that has been covered by the black matrix (BM) as an opening area, thereby enhancing the transmittance of a pixel.

Furthermore, as illustrated in FIG. 7, a column spacer 247 for maintaining a cell gap with respect to the insulating substrate 201 is protruded at an upper portion of the red, green and blue color filter layers 245 to be inserted into the opening portion 221 formed at an upper portion of the thin-film transistor (T) formed on the insulating substrate 201.

In addition, a liquid crystal layer 251 is formed between the color filter substrate 241 and the insulating substrate 201 bonded to each other to configure a fringe field switching (FFS) mode liquid crystal display device according to an embodiment of the invention.

Through the foregoing configuration, the plurality of common electrodes 233a supply a reference voltage for driving liquid crystals, namely, a common voltage, to each pixel.

The plurality of common electrodes 233a are overlapped with the pixel electrode 223a having a large area by interposing the passivation layer 227 therebetween at each pixel region to form a fringe field.

In this manner, if a data signal is supplied to the pixel electrode 223a through the thin-film transistor (T), then the common electrode 233a supplied by a common voltage forms a fringe field so that liquid crystal molecules aligned in a horizontal direction between the insulating substrate 201 and the color filter substrate 241 are rotated by dielectric anisotropy, and thus, the light transmittance of liquid crystal molecules passing through a pixel region varies according to the rotational degree, thereby implementing gradation.

Accordingly, according to a fringe field switching (FFS) mode liquid crystal display device having the foregoing configuration in accordance with an embodiment of the invention, a photosensitive photo acryl layer used to reduce a parasitic capacitance in the related art can be used as is, thereby reducing power consumption.

Furthermore, according to an another embodiment of the invention, a drain contact hole in the related art that has been formed to electrically connect a drain electrode to a pixel electrode is removed, and an opening portion for exposing an upper portion of the thin-film transistor is formed on an organic insulating layer such that the exposed thin-film transistor and the pixel electrode are electrically connected to each other in a direct manner, and thus, an area that has been used to form a drain contact hole in the related art can be used as an opening area to remove a drain contact hole formation portion in the related art that has been a cause of transmittance reduction, thereby enhancing transmittance by more than about 20 percent compared to the related art.

On the other hand, a method of fabricating an array substrate for a fringe field switching (FFS) mode liquid crystal display device having the foregoing configuration according to an embodiment of the invention will be described below with reference to FIGS. 8A through 8O.

Figure 8A:
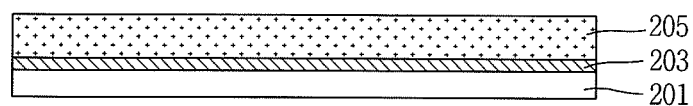
FIGS. 8A through 8O are fabrication process cross-sectional views illustrating an array substrate for a fringe field switching (FFS) mode liquid crystal display device according to another embodiment of the invention.
Figure 8B:
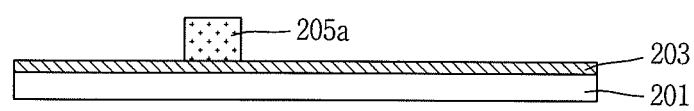
Figure 8C:
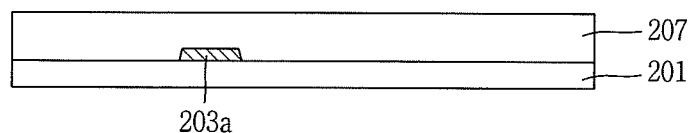
Figure 8D:
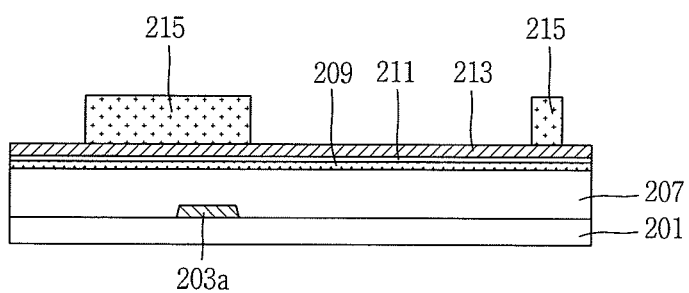
Figure 8E:
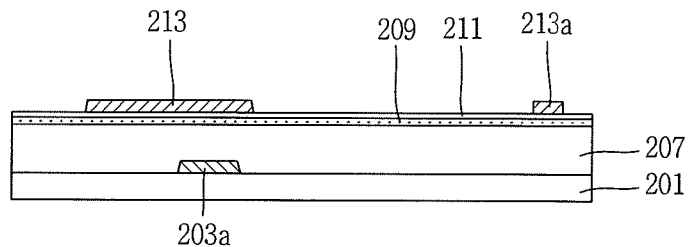
Figure 8F:
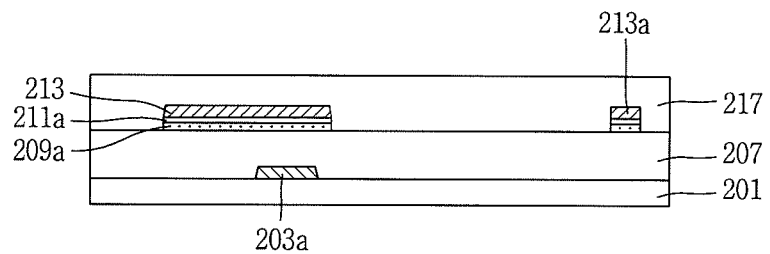
Figure 8G:
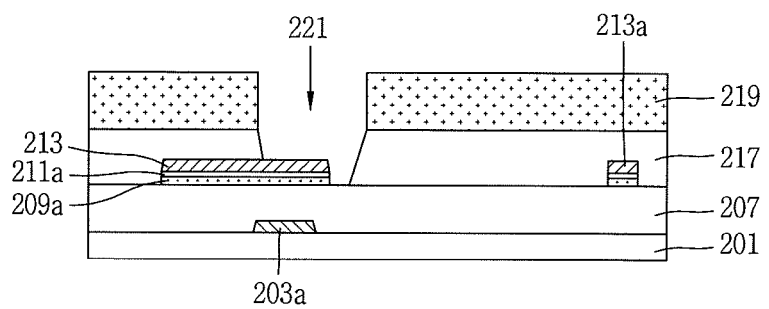
Figure 8H:
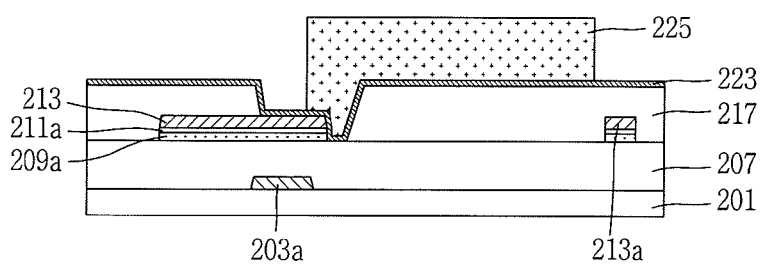
Figure 8I:
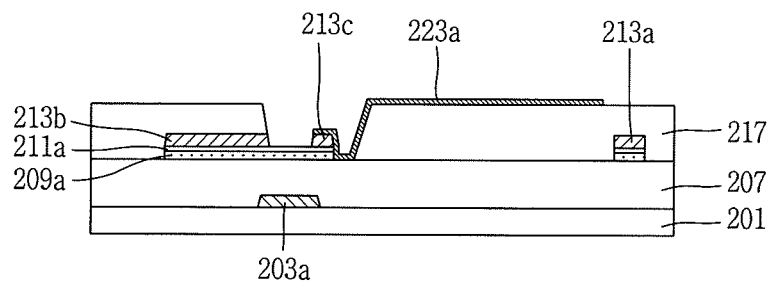
Figure 8J:
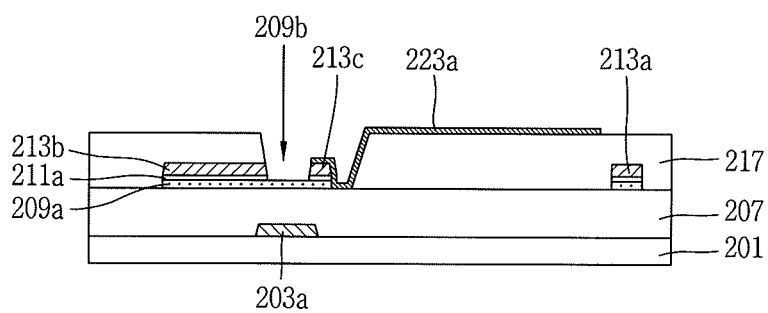
Figure 8K:
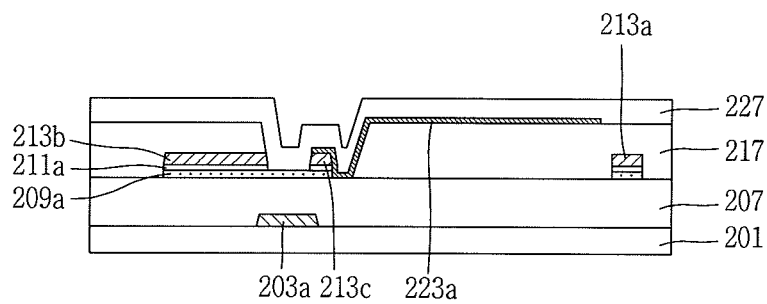
Figure 8L:
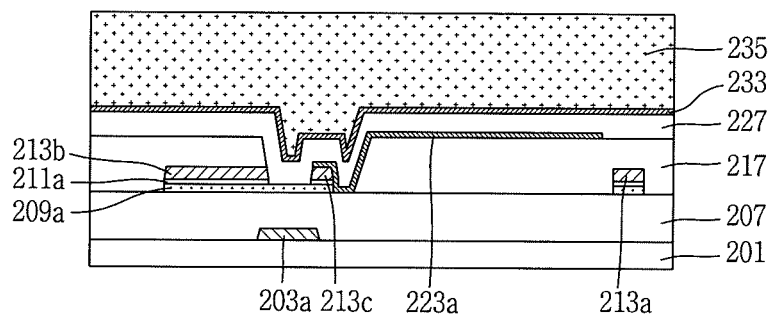
Figure 8M:
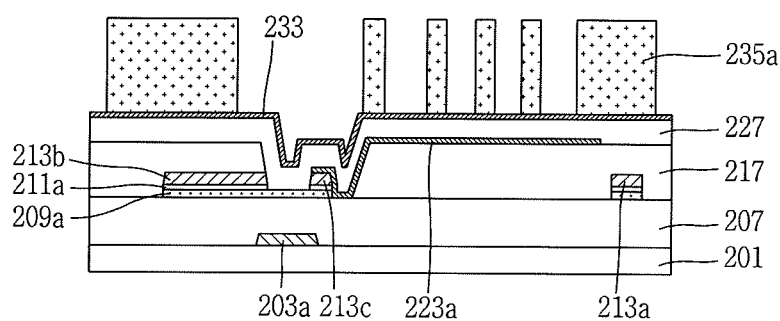
Figure 8N:
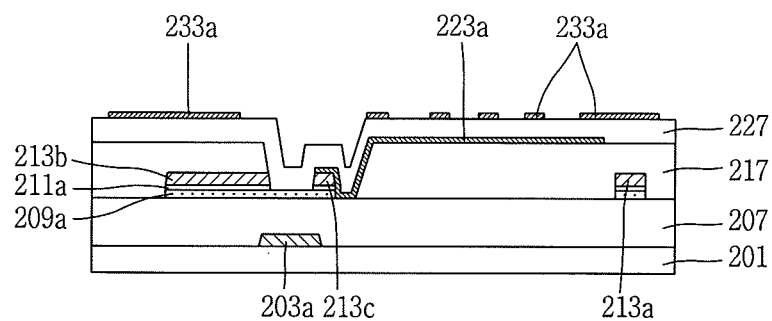
Figure 8O:
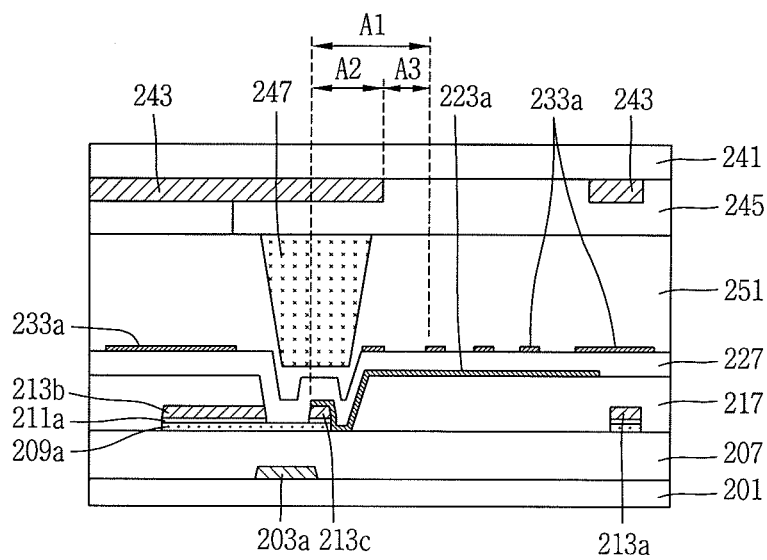

FIGS. 8A through 8O are fabrication process cross-sectional views illustrating an array substrate for a fringe field switching (FFS) mode liquid crystal display device according to another embodiment of the invention.

As illustrated in FIG. 8A, a plurality of pixel regions including a switching function are defined on a transparent insulating substrate 201, and a first conductive metal layer 203 is deposited on the transparent insulating substrate 201 by a sputtering method. In this instance, at least one selected from the group consisting of aluminium (Al), tungsten (W), copper (Cu), molybdenum (Mo), chromium (Cr), titanium (Ti), moly-tungsten (MoW), moly-titanium (MoTi), copper/moly-titanium (Cu/MoTi) may be used for a target material for forming the first conductive metal layer 203.

Next, a photoresist having a high transmittance is deposited at an upper portion of the first conductive metal layer 203 to form a first photosensitive layer 205.

Subsequently, as illustrated in FIG. 8B, an exposure process is carried out on the first photosensitive layer 205 through a photolithography process technology using an exposure mask, and then the first photosensitive layer 205 is selectively removed through a development process to form a first photosensitive pattern 205a.

Next, as illustrated in FIG. 8C, the first conductive metal layer 203 is selectively etched by using the first photosensitive pattern 205a as a blocking layer to form a gate line; refer to reference numeral 103 in FIG. 4), a gate electrode 203a extended from the gate line, and a common line separated from and in parallel with the gate line at the same time.

Subsequently, the first photosensitive pattern 205a is removed, and then a gate insulating layer 207 made of silicon nitride (SiNx) or silicon oxide (SiO$_2$) is formed at a front surface of the substrate including the gate electrode 203a.

Next, as illustrated in FIG. 8D, amorphous silicon layer (a-Si:H) 209 and amorphous silicon layer (n+ or p+) 211 containing impurities are sequentially deposited on the gate insulating layer 207. At this time, the amorphous silicon layer (a-Si:H) 209 and amorphous silicon layer (n+ or p+) 211 containing impurities are deposited using a Chemical Vapour Deposition (CVD) method. At this time, an oxide-based material layer such as indium gallium zinc oxide (IGZO) instead of the amorphous silicon layer (a-Si:H) 209 may be formed on the gate insulating layer 207 and applied to an oxide thin-film transistor.

Subsequently, a second conductive layer 213 is deposited at a front surface of the substrate 201 including the amorphous silicon layer (n+ or p+) 211 containing impurities using a sputtering method. At this time, at least one selected from the group consisting of aluminium (Al), tungsten (W), copper (Cu), molybdenum (Mo), chromium (Cr), titanium (Ti), moly-tungsten (MoW), moly-titanium (MoTi), copper/moly-titanium (Cu/MoTi) may be used for a target material for forming the second conductive metal layer 213.

Subsequently, a photoresist having a high transmittance is deposited at an upper portion of the second conductive layer 213 to form a second photosensitive layer.

Next, an exposure process is carried out on the second photosensitive layer through a photolithography process technology using an exposure mask, and then the second photosensitive layer is selectively removed through a development process to form a second photosensitive pattern 215.

Subsequently, as illustrated in FIG. 8E, the second conductive layer 213 is selectively wet-etched by using the second photosensitive pattern 215 as an etching mask to define a source electrode and drain electrode formation region together with the data line 213a crossed with the gate line 203 in a vertical direction (or with a vertical separation).

Next, as illustrated in FIG. 8F, a portion of the conductive layer 213 corresponding to the source electrode and drain electrode formation region and the amorphous silicon layer (n+ or p+) 211 containing impurities and amorphous silicon layer (a-Si:H) 209 below the data line 213a are sequentially etched through a dry etching process to form an ohmic contact layer 211a and an active layer 209a. At this time, a portion of the conductive layer 213 corresponding to the source electrode and drain electrode formation region and the amorphous silicon layer (n+ or p+) 211 containing impurities and amorphous silicon layer (a-Si:H) 209 below the data line 213a are patterned at the same time, and thus, an active tail will not occur.

Subsequently, the second photosensitive pattern 215 is removed, and then an inorganic insulating layer or organic insulating layer 217 is deposited at a front surface of the substrate including the active layer 209a and ohmic contact layer 211a, a portion of the conductive layer 213 corresponding to the source electrode and drain electrode formation region and the data line 213a. At this time, a photo acryl material or other photosensitive organic insulating materials exhibiting photosensitivity may be used for the organic insulating layer 217. Furthermore, since the photo acryl exhibits photosensitivity, an exposure process can be carried out without forming a separate photoresist during the exposure process. Furthermore, any one selected from silicon nitride (SiNx) and other inorganic insulating materials may be used for the inorganic insulating layer.

Next, as illustrated in FIG. 8G, an exposure process is carried out on the organic insulating layer 217 through a photolithography process technology using an exposure mask, and then the organic insulating layer 217 is selectively removed through a development process to form an opening portion 221 for exposing an upper portion (or a part thereof) of the conductive layer 213 corresponding to the source electrode and drain electrode formation region. At this time, the opening portion 221 is formed at a portion of the thin-film transistor (T), namely, a source electrode and drain electrode formation region. Furthermore, a side wall of the ohmic contact layer 211a and active layer 209a including an upper portion of the conductive layer 213 corresponding to the source electrode and drain electrode formation region and a partial upper surface of the gate insulating layer 207 are exposed through the opening portion 221.

Subsequently, as illustrated in FIG. 8H, a transparent conductive material is deposited at an upper portion of the organic insulating layer 217 including the opening portion 221 using a sputtering method to form a first transparent conductive material layer 223. At this time, any one composition target selected from a transparent conductive material group including Indium Tin Oxide (ITO), Indium Zinc Oxide (IZO), and the like is used for the transparent conductive material. Furthermore, the first transparent conductive material layer 223 is directly brought into contact with a surface of the conductive layer 213 corresponding to the source electrode and drain electrode formation region and a side wall of the ohmic contact layer 2111a and active layer 209a.

Next, a photoresist having a high transmittance is deposited at an upper portion of the first transparent conductive material layer 223 to form a third photosensitive layer.

Subsequently, an exposure process is carried out on the third photosensitive layer through a photolithography process technology using an exposure mask, and then the third photosensitive layer is selectively removed through a development process to form a third photosensitive pattern 225. At this time, the third photosensitive pattern 225 exposes all portions excluding the pixel electrode formation region in the first transparent conductive material layer 223.

Next, as illustrated in FIG. 8I, the first transparent conductive material layer 223 and the second conductive layer 213 at a lower portion thereof are selectively etched by using the third photosensitive pattern 225 as an etching mask to form a pixel electrode 223a electrically connected to the drain electrode 213c in a direct manner, together with the source electrode 213b and drain electrode 213c at the same time. At this time, the pixel electrode 223a is directly brought into contact with a side wall of the ohmic contact layer 211a and active layer 209a together with the drain electrode 213c through the opening portion 221. Furthermore, a portion of the ohmic contact layer 211a between the source electrode 213b and drain electrode 213c is also exposed during the formation of the source electrode 213b and drain electrode 213c. Then, an upper portion of the source electrode 213b and a portion of the transparent conductive layer 223 covered on the organic insulating layer 217 corresponding to the source electrode 213b are also removed through an etching process. Accordingly, the opening portion 221 exposes the upper portions of the gate portion above the gate electrode 203a, the active layer 209a corresponding to a channel region, and the drain electrode 213c.

Subsequently, as illustrated in FIG. 8J, a portion of the exposed ohmic contact layer 211a is selectively etched through a dry etching process to expose a channel region 209b of the active layer 209a at a lower portion of the ohmic contact layer 211a.

Next, as illustrated in FIG. 8K, the third photosensitive pattern 225 is removed, and then an inorganic insulating material or organic insulating material is deposited at a front surface of the substrate including the source electrode 213b, drain electrode 213c and pixel electrode 223a to form a passivation layer 227.

Subsequently, as illustrated in FIG. 8L, a transparent conductive material is deposited at an upper portion of the passivation layer 227 using a sputtering method to form a second transparent conductive material layer 233. At this time, any one composition target selected from a transparent conductive material group including Indium Tin Oxide (ITO), Indium Zinc Oxide (IZO), and the like is used for the second transparent conductive material 233.

Next, a photoresist having a high transmittance is deposited at an upper portion of the second transparent conductive material layer 233 to form a fourth photosensitive layer 235.

Subsequently, as illustrated in FIG. 8M, an exposure process is carried out on the fourth photosensitive layer 235 through a photolithography process technology using an exposure mask, and then the fourth photosensitive layer 235 is selectively removed through a development process to form a fourth photosensitive pattern 235a.

Next, as illustrated in FIG. 8N, the second transparent conductive material layer 133 is selectively etched by using the fourth photosensitive pattern 235a as an etching mask to form a plurality of common electrodes 233a separated from one another while being overlapped with the pixel electrode 223a.

Next, the remaining fourth photosensitive pattern 235a is removed to complete the process of fabricating an array substrate for an AH-IPS mode liquid crystal display device according to an embodiment of the invention.

Then, as illustrated in FIG. 8O, a black matrix layer 243 for blocking light being entered into a region excluding the pixel area is formed on the color filter substrate 241.

Next, red, green and blue color filter layers 245 are formed on the color filter substrate 241 including the black matrix layer 243.

Subsequently, a column spacer 247 for maintaining a cell gap between the color filter substrate 241 and the insulating substrate 201 bonded to each other is formed at an upper portion of the color filter layer 245 to complete the process of fabricating a color filter array substrate. At this time, the process of forming an alignment layer on a surface of the color filter layer 245 may be additionally carried out. Furthermore, in the instance where the color filter substrate 241 and the insulating substrate 201 are bonded to each other, the column spacer 247 is inserted into the opening portion 221 formed on the insulating substrate 201 to prevent the insulating substrate 201 from being released in a horizontal direction, and thus, the bonding is properly carried out without any twisting. In other words, the opening portion 221 plays a role of fixing the column spacer 247.

Subsequently, the process of forming a liquid crystal layer 251 between the color filter substrate 241 and the insulating substrate 201 is carried out to complete the process of fabricating an AH-IPS mode liquid crystal display device according to an another embodiment of the invention.

On the other hand, a fringe field switching (FFS) mode liquid crystal display device and method for fabricating the same according to another embodiment of the invention may be applicable to a liquid crystal display device having a color filter on TFT (COT) structure.

As described above, according to embodiments of the invention, a drain contact hole in the related art that has been formed to electrically connect a drain electrode to a pixel electrode is removed, and an opening portion for exposing an upper portion of the thin-film transistor is formed on an organic insulating layer such that the exposed thin-film transistor and the pixel electrode are electrically connected to each other in a direct manner, and thus, an area that has been used to form a drain contact hole in the related art can be used as an opening area to remove a drain contact hole formation portion in the related art that has been a cause of transmittance reduction, thereby enhancing transmittance by more than about 20 percent compared to the related art.

Furthermore, according to an array substrate for a fringe field switching (FFS) mode liquid crystal display device and method for fabricating the same in accordance with an embodiment of the invention, a photosensitive photo acryl layer used to reduce a parasitic capacitance in the related art can be used as is, thereby reducing power consumption.

Although the example embodiments of the invention have been described in detail, it should be understood by those skilled in the art that various modifications and other equivalent embodiments thereof can be made.

Consequently, the scope of the invention is not limited to the embodiments, and various modifications and improvements thereto made by those skilled in the art using the basic concept of the invention as defined in the accompanying claims will fall in the scope of the invention.

What is claimed is:

1. A liquid crystal display device, comprising:
    a substrate;
    a gate line formed in one direction on a surface of the substrate;
    a data line formed on the substrate, and crossed with the gate line to thereby define a pixel region;
    a thin-film transistor formed on the substrate, and formed at an intersection of the gate line and the data line;
    an insulating layer having an opening portion located at an upper portion of the thin-film transistor to expose at least a gate portion of the thin-film transistor;
    a pixel electrode formed at an upper portion of the insulating layer, and connected to the exposed thin-film transistor;
    a passivation layer formed at the upper portion of the insulating layer including the pixel electrode; and
    a plurality of common electrodes formed at an upper portion of the passivation layer and separated from one another.

2. The liquid crystal display device of claim 1, wherein the opening portion exposes upper portions of a source electrode, the gate portion, an active layer corresponding to a channel region, and a drain electrode constituting the thin-film transistor.

3. The liquid crystal display device of claim 2, wherein the opening portion completely exposes the drain electrode.

4. The liquid crystal display device of claim 2, wherein the source electrode and the drain electrode are a single layer of ITO or a multi-layer of copper and ITO.

5. The liquid crystal display device of claim 2, further comprising a dummy transparent conductive layer pattern formed at a sidewall of the opening portion and on the source electrode.

6. The liquid crystal display device of claim 2, wherein the pixel electrode is in direct contact with the drain electrode.

7. The liquid crystal display device of claim 1, wherein a source electrode is formed with a single layer structure having a conductive metal layer or a double layer structure having a conductive metal layer and a transparent conductive layer.

8. The liquid crystal display device of claim 1, wherein the insulating layer is formed with any one selected from an organic insulating material including a photosensitive photo acryl layer and an inorganic insulating material including a silicon nitride layer.

9. The liquid crystal display device of claim 1, further comprising:
    a liquid crystal layer formed between the substrate and another substrate together with a black matrix, a color filter layer and a column spacer formed on the another substrate.

10. The liquid crystal display device of claim 9, wherein the column spacer is located within the opening portion to be inserted therein.

11. A method of fabricating a liquid crystal display device, the method comprising:
    providing a substrate;
    forming a gate line in one direction on a surface of the substrate;
    forming a data line crossed with the gate line to thereby define a pixel region, and a thin-film transistor at an intersection of the gate line and the data line on the substrate;
    forming an insulating layer having an opening portion located at an upper portion of the thin-film transistor to expose at least a gate portion of the thin-film transistor;
    forming a pixel electrode connected to the exposed thin-film transistor through the opening portion at an upper portion of the insulating layer;
    forming a passivation layer at the upper portion of the insulating layer including the pixel electrode; and forming a plurality of common electrodes separated from one another at an upper portion of the passivation layer.

12. The method of claim 11, further comprising:
forming a black matrix, a color filter layer, and a column spacer on another substrate; and
disposing a liquid crystal layer between the substrate and the another first substrate and the second substrate.

13. The method of claim 12, wherein the column spacer is located within the opening portion to be inserted therein.

14. The method of claim 11, wherein the opening portion exposes upper portions of a source electrode and a drain electrode constituting the thin-film transistor, and a side wall of the ohmic contact layer and an active layer, and an upper portion of the ohmic contact layer corresponding to a channel region.

15. The method of claim 14, wherein the pixel electrode is in direct contact with the side wall of the ohmic contact layer and the active layer together with the drain electrode.

16. The method of claim 14, wherein the source electrode and the drain electrode are a single layer of ITO or a multi-layer of copper and ITO.

17. The method of claim 11, wherein the insulating layer is formed with any one selected from an organic insulating material including a photosensitive photo acryl layer and an inorganic insulating material including a silicon nitride layer.

18. The method of claim 11, wherein, in forming of pixel electrode, a dummy pattern is simultaneously formed together with the pixel electrode.

19. A liquid crystal display device, comprising:
a substrate;
a gate line formed in one direction on a surface of the substrate;
a data line formed on the substrate, and crossed with the gate line to thereby define a pixel region;
a thin-film transistor formed on the substrate, and formed at an intersection of the gate line and the data line;
an insulating layer having an opening portion located at an upper portion of the thin-film transistor to expose a source electrode and a gate portion of the thin-film transistor;
a pixel electrode formed at an upper portion of the insulating layer, and connected to the exposed thin-film transistor;
a passivation layer formed at the upper portion of the insulating layer including the pixel electrode; and
a plurality of common electrodes formed at an upper portion of the passivation layer and separated from one another.

20. The liquid crystal display device of claim 19, wherein the opening portion further exposes upper portions of an active layer corresponding to a channel region, and a drain electrode constituting the thin-film transistor.

* * * * *